United States Patent
Zen

(10) Patent No.: US 7,333,962 B2
(45) Date of Patent: Feb. 19, 2008

(54) TECHNIQUES TO ORGANIZE TEST RESULTS

(75) Inventor: Lee-Ming Zen, Standford, CA (US)

(73) Assignee: Microsoft Corporation, Redmond, WA (US)

( * ) Notice: Subject to any disclaimer, the term of this patent is extended or adjusted under 35 U.S.C. 154(b) by 24 days.

(21) Appl. No.: 11/359,742

(22) Filed: Feb. 22, 2006

(65) Prior Publication Data

US 2007/0198445 A1    Aug. 23, 2007

(51) Int. Cl.
*G06N 5/00* (2006.01)

(52) U.S. Cl. ............................ 706/15; 706/45; 700/83; 700/17; 713/600

(58) Field of Classification Search ................ 706/15, 706/45; 382/132; 436/43; 600/450; 700/17, 700/83; 713/600
See application file for complete search history.

(56) References Cited

U.S. PATENT DOCUMENTS

| | | | | | |
|---|---|---|---|---|---|
| 5,565,364 | A | * | 10/1996 | Schaefer et al. | 436/43 |
| 5,774,357 | A | * | 6/1998 | Hoffberg et al. | 713/600 |
| 5,867,386 | A | * | 2/1999 | Hoffberg et al. | 700/83 |
| 5,871,019 | A | * | 2/1999 | Belohlavek | 600/450 |
| 5,875,108 | A | * | 2/1999 | Hoffberg et al. | 700/17 |
| 6,091,841 | A | * | 7/2000 | Rogers et al. | 382/132 |
| 6,115,488 | A | * | 9/2000 | Rogers et al. | 382/132 |

* cited by examiner

*Primary Examiner*—Wilbert L Starks, Jr.

(57) ABSTRACT

Techniques to organize test results are described. In one embodiment, for example, vectors with failure information may be generated from test result files. Nodes for a self-organizing map may be trained with multiple vectors. Vector groups may be formed for multiple nodes with the self-organizing map. Other embodiments are described and claimed.

20 Claims, 5 Drawing Sheets

TECHNIQUES TO ORGANIZE TEST RESULTS

BACKGROUND

Development of a new product may involve extensive testing. Automated testing techniques may be used to drive a product through various states to simulate use and user interactions. In some cases, the automated tests may generate a relatively large number of test results. The test results, however, may not necessarily correlate with each other. Consequently, it may be difficult to analyze the potentially large number of test results to identify and correct faults.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments may be generally directed to organizing test results to facilitate, for example, test result analysis. The test results may include multiple test result files having failure information. In one embodiment, for example, a vector may be generated with failure information from each test result file. Some or all of the vectors may be used to train multiple nodes for a self-organizing map. Once the self-organizing map has been trained, vector groups for multiple nodes may be formed with the self-organizing map. The vector groups may be displayed using, for example, a graphic user interface. Other embodiments are described and claimed.

DETAILED DESCRIPTION

Figure 1:
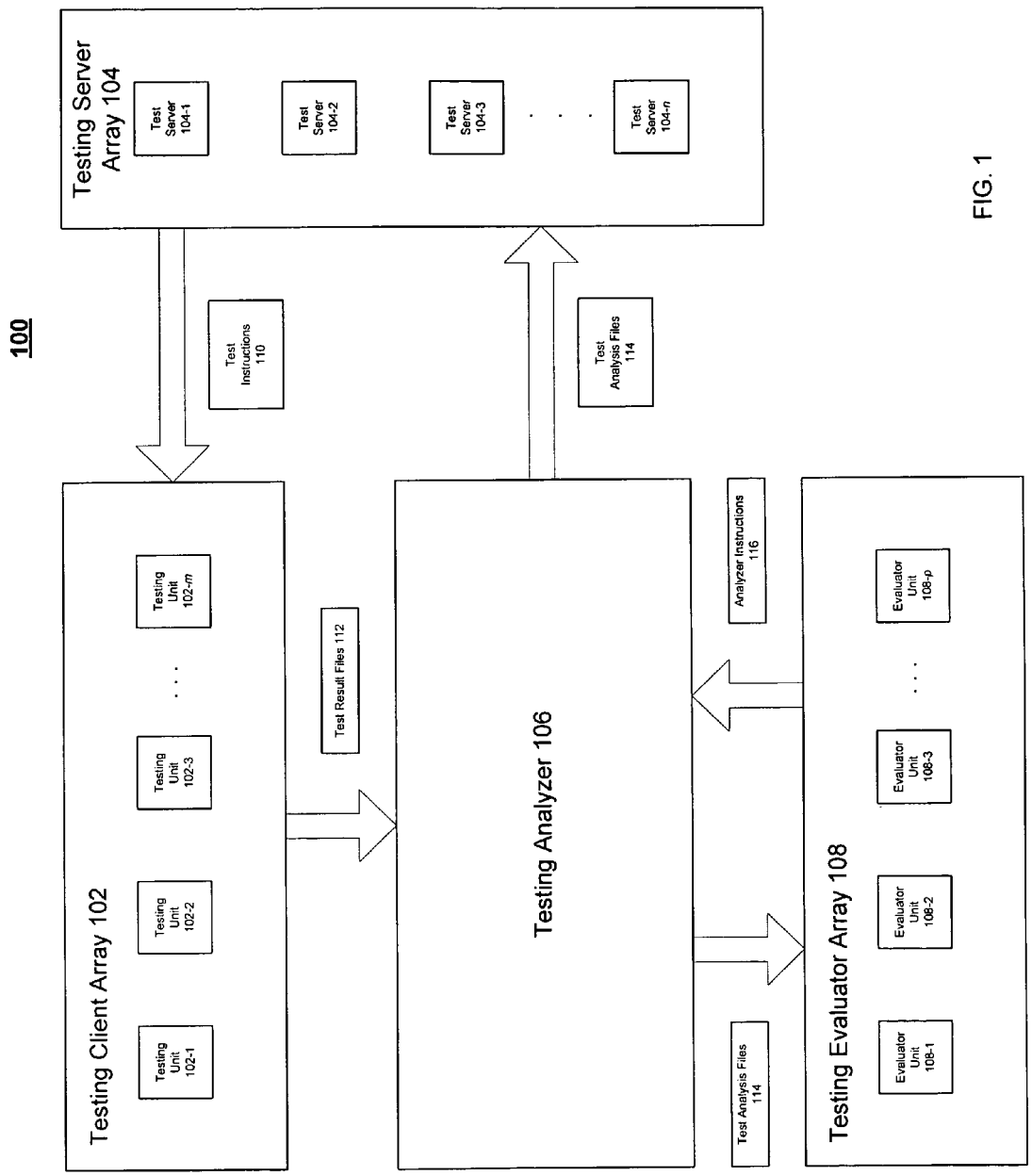
FIG. 1 illustrates an exemplary embodiment of a testing system.

FIG. 1 illustrates one embodiment of a testing system. FIG. 1 illustrates a block diagram for a testing system 100. Testing system 100 may represent a general system architecture suitable for a testing laboratory that is arranged to perform automated testing operations for a target object. The target object may include any type of product capable of being measured using automated test operations to produce multiple test results. For clarity and by way of representative example only, testing system 100 may be further described below with elements suitable to perform automated testing operations for a software product as the test object. Testing system 100 may potentially be used for other test objects appropriate for automated testing that produces multiple test results as well. For example, testing system 100 may be used to test such target objects as consumer products, automotive products, electronic and electrical products, communications products, pharmaceutical products, biotech products, chemical products, mechanical products, financial products, and so forth. In some cases, testing system 100 may need to be implemented using additional elements suitable for measuring certain logical or physical characteristics for a given target object to gather the relevant data needed for a given set of automated test operations. Examples of such additional elements may include various probes, electrical sensors, chemical sensors, temperature sensors, speed sensors, movement sensors, articulated robotic arms, radio-frequency signals, magnetic waves, electromagnetic waves, varying frequencies of light, sound waves, and so forth. The embodiments are not limited in this context.

In various embodiments, testing system 100 may comprise multiple elements. An element may comprise any structure arranged to perform certain operations. As shown in FIG. 1, for example, testing system 100 may comprise elements such as a testing client array 102, a testing server array 104, a testing analyzer 106, and a testing evaluator array 108. Each element may be implemented as hardware, software, or any combination thereof, as desired for a given set of design parameters or performance constraints. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software may include any software components, programs, applications, computer programs, application programs, system programs, machine programs, operating system software, middleware, firmware, software modules, routines, subroutines, functions, methods, interfaces, software interfaces, application program interfaces (API), instruction sets, computing code, computer code, code segments, computer code segments, words, values, symbols, or any combination thereof. Although testing system 100 as shown in FIG. 1 has a limited number of elements in a certain topology, it may be appreciated that testing system 100 may include more or less elements in alternate topologies as desired for a given implementation. The embodiments are not limited in this context.

In general operation, testing system 100 may be used to perform testing operations for a test object, such as a software application, for example. Testing operations typically involve performing an operation to determine if the actual result matches an expected result. If the actual and expected results do not match, the test typically results in a failure. Testing is widely used in virtually every industry to determine valuable information about products, systems, employees, organizations, and more. Software developers in particular make heavy use of testing. Consumers expect purchased software products to work on their computer systems. A software product that has not been fully tested may fail consumer expectations if it causes frequent computer system malfunctions. Untested products may also cause more serious problems, such as opening a security loophole for attackers, causing a loss of productivity due to system failures, causing the loss of large amounts of valuable data, and so forth.

Testing software products may provide a number of design and implementation considerations. For example, one design consideration is defining the number and scope of testing operations for a given software application. Software operations occur in many scenarios within computer systems. Computer systems are built using a wide variety of components that may have different arrangements or configurations. The state of the components changes when they are called upon to execute software. Therefore software testing typically involves not only testing the many operations that a software application may perform, but testing those operations in a subset of the various scenarios in which the operations are likely to occur. Another design consideration is the level of automation used for software testing. Automating software testing has become important largely because of the relatively large volume of tests that are generally performed for a typical software application. Because software is often quite complex, there are many operations performed by any given application that may need testing. This may produce a potentially enormous number of tests that may be desirable for fully testing a software product. As a result, automated software testing techniques have been developed to automatically set up tests, and return test result files providing information about the test results. One type of test result information, for example, may include test failures and information that may aid in investigating the cause of such failures.

The sheer volume of tests and corresponding test result files may create problems in analyzing the test result files. Test result analysis may refer to analyzing certain characteristics of a test run. One characteristic may include analyzing failure information to determine why a particular operation failed a test. There are a number of techniques to assist in analyzing test results. These techniques, however, may be unsatisfactory for a number of reasons. For example, one technique is to perform statistical analysis for test result files, such as computing a percentage of tested operations that failed. Developers may set a target failure rate for their product, such as 99%, which suggests that 99% of the scenarios in which an operation is performed will not yield failures. As soon as a given operation works 99% of the time, investigation of failures for the product can cease and the product is ready to ship. The percentage approach, however, may be unsatisfactory in that the failures that are not solved may be particularly troublesome. Furthermore, the percentage approach does not provide any information about the failed results. Therefore tools that provide failure statistics do not necessarily lend themselves to ideal techniques for analyzing test results.

Some embodiments may be directed to solving these and other problems. Testing system 100 may be used to organize automated test results to facilitate, for example, test result analysis. Previously, there was no easy way to find global issues causing multiple failures in a test run. This type of activity is typically performed by a human operator to "scout" a run. An example of finding such a global issue might be something such as one critical part of the product failing to work. As a result, a large number of unrelated test cases that all use this feature of the product may fail during a test run. Because they are unrelated, it is not obvious from the surface why all these failures occurred. A human operator would need to examine the individual failures and realize that these test cases are related by some global issue. Testing system 100 attempts to relieve the user from identifying which test cases are related, thereby allowing the user to spend more time identifying issues, potential causes, and corrective measures.

In various embodiments, testing system 100 may include testing client array 102. Testing client array 102 may comprise multiple testing units 102-1-$m$. Testing units 102-1-$m$ may be used individually or collectively to perform testing operations for a test object, such as a software application. For example, testing units 102-1-$m$ may be used independently to test different software applications or the same software application. Testing units 102-1-$m$ may also be used collectively to test a single software application or multiple software applications in a distributed manner.

In various embodiments, testing units 102-1-$m$ may be implemented using any device having a processing system. A typical processing system may comprise, for example, a processor, memory units, and/or any associated controllers or interfaces. Examples of devices with a processing system may include, but are not necessarily limited to, a computer system, a computer sub-system, a computer, a workstation, a terminal, a server, a personal computer (PC), a laptop computer, an ultra-laptop computer, a portable computer, a handheld computer, a personal digital assistant (PDA), a mobile computing device, and any other electronic, electromechanical, or electrical device. In one embodiment, for example, testing units 102-1-$m$ may be implemented as computers, servers or workstations. The embodiments, however, are not limited in this context.

In various embodiments, testing system 100 may include testing server array 104. Testing server array 104 may comprise multiple test servers 104-1-$n$. Each test server 104-1-$n$ may operate as an automation controller to manage testing operations for testing client array 102. Test servers 104-1-$n$ may be implemented using similar devices as described with reference to testing units 102-1-$m$, and other as well. Test servers 104-1-$n$ may provide test instructions 110 to one or more testing units 102-1-$m$ of testing client array 102. Test instructions 110 may include any appropriate commands or data used to control testing operations for testing client array 102 in accordance with a particular testing product used to perform the testing operations.

In general operation, testing client array 102 may operate with testing server array 104 to perform automated testing operations for a test object such as a software application. Testing client array 102 and testing server array 104 may operate in a peer-to-peer, client-server, or distributed architecture, as desired for a given implementation. Testing client array 102 and/or testing server array 104 may execute various types of software testing products. Examples of software testing products may include, but are not necessarily limited to, AUTOTESTER® from AUTOTESTER®, HOURGLASS 2000® from MAINWARE®, OPTA2000® from TANDSOFT®, PANORAMA-2® from INTERNATIONAL SOFTWARE AUTOMATION®, SIM2000® from DPE & ASSOCIATES®, SIMULATE 2000® from PRINCE SOFTWARE®, TARGET2000® from TARGETFOUR®, TRANSCENTURY DATE SIMULATOR® and ENTERPRIZE TESTER® from PLATINUM®, TALC 2000® from EXECOM®, TICTOC® from CICS®, TEST 2000® and AGER 2000® from MVS®, VECTORCAST® from VECTOR SOFTWARE®, VIA/AUTOTEST® from VIASOFT®, TEST SUITE 2000® from MERCURY INTERACTIVE®, WORKBENCH/2000® from MICROFOCUS®, and so forth. These products are software that may generally help in automating the set up and execution of test runs in a way that returns useful test result files, such as test result files 112.

Testing client array 102 and testing server array 104 may use automated testing techniques to perform a large volume of predetermined tests, and return test result files 112 that may aid in the investigation of failures. Test result files 112 may comprise computer readable files containing information about a test and the result of the test. Test result files 112 can be automatically generated, as in the case of automated software testing, or can be manually generated by a human entering information about test results into a computer. It may be appreciated that test result files 112 may represent results from a single test or multiple tests, as desired for a given implementation. When representing multiple tests, a single test result file 112 may have a data structure that allows other elements of testing system 100 (e.g., testing analyzer 106) to extract and parse information representing individual tests. The embodiments are not limited in this context.

In various embodiments, test result files 112 may include failure information. Failure information may refer to any information or data that indicates a software product has failed a given set of test conditions. The failure information typically includes relevant test result information that is likely to be useful for analysis. In the context of software testing, there are several properties, characteristics or dimensions that may be considered useful in analyzing test failures. For example, failure information may include the actual output of a tested operation. In other words, if a tested operation is to sum two numbers and the expected sum does not meet the actual sum, it can be useful to have this information for analysis. In another example, a test result itself may be a likely candidate for extraction from a test result file 112. A test can be passed or failed, or some other result that provides additional information about the result may be returned, such as failure messages. Examples of failure messages may include a warning message indicating that the tested operation returned a warning, an exception message indicating that the tested operation returned an exception, an unknown message indicating that the result of the tested operation is not known, a timeout message indicating that the operation did not complete, an aborted message indicating that an operation was aborted, and so forth. In yet another example, call-stack information indicating the calls that were made in the course of the tested operation may be useful to extract from a test result file 112. In still another example, image information such as a screen shot may be useful to extract from a test result file 112. The screen shot may capture the screen displaying the error message and the operating state of the GUI of the software application at the time of failure, which may yield useful information for analysis. These are merely a few examples of the type of failure information that may be desired for testing result analysis. Other failure information may be used as desired for a given implementation, and the embodiments are not meant to be limited in this context.

In various embodiments, test result files 112 can be stored in any computer readable format as desired for a given implementation. One example of a file format may include the Extensible Markup Language (XML) format, which utilizes tags to identify data in a file. Other examples of file formats may include the Hyper-Text Markup Language (HTML), the MICROSOFT WORD® Markup Language (WordML), and so forth. Numerous other file formats are available and often vary based on an application designed to use the format. For example, a file can be in .doc, .txt, .rtf, .pdf, or .vsd format, to name only a few. While some file formats may be described herein by way of example, the embodiments are not necessarily limited to the file format in which individual test results are packaged. Regardless of the file format used for test result files 112, a program can be written to parse the file and extract the relevant failure information for use in connection with the techniques described herein as long as test result files 112 are consistently tagged and structured.

To perform automated testing operations, testing client array 102 may receive test instructions 110 from testing server array 104. Testing client array 102 may initiate or perform automated testing operations in accordance with test instructions 110. Testing units 102-1-m may perform test runs on the target software application. For example, testing units 102-1-m may automatically perform a set of test operations in a test lab run that involves performing a number of tests in a variety of scenarios. A short lab run for a commercial software developer, which tests only a subset of operations against a single operating system, may approach 300,000 tests or more. A full lab run may go well beyond 1,000,000 tests, thereby causing testing client array 102 to potentially output a large volume of test result files 112 to testing analyzer 106.

The sheer volume of potential tests and test result files 112 may prove difficult to analyze. A typical lab run may yield an average pass rate of approximately 95%. Despite such a high yield a developer may need to investigate well over 50,000 failures. Furthermore, numerous lab runs may be conducted per week for products in the final stages of development. There may also be multiple products to be tested, along with updates to products that are often distributed by software developers. In this environment, verification of test results quickly becomes an unmanageable task. Employees hired to investigate failures may spend significant time verifying lab run results, thereby diminishing resources for other testing activities such as writing new tests or improving existing tests.

In various embodiments, testing system 100 may include testing analyzer 106. Testing analyzer 106 may be arranged to assist in analyzing and organizing the large volumes of test result files 112 received from testing client array 102. Testing analyzer 106 may receive test result files 112, and organize test result files 112 into useful groups to facilitate further test result analysis. For example, testing analyzer 106 may automatically group related test result files together and disperse unrelated test result files away from each other. The groupings may assist a human test analyzer to perform more detailed results analysis by allowing the human test analyzer to focus on particular groups or clusters of failures. The groupings may be communicated to the human test analyzer using a graphical user interface (GUI) thereby allowing quick evaluation and prioritization of investigation operations. For example, the human test analyzer may be able to prioritize an order of analysis based on numbers of failures per group.

In one embodiment, for example, testing analyzer 106 may parse and extract failure information from one or more test result files 112. Testing analyzer 106 may generate a set of vectors, with each vector representing a corresponding set of failure information for a given test result. Testing analyzer 106 may use some or all of the vectors to train multiple nodes for a self-organizing map (SOM). The SOM may comprise, for example, multiple nodes connected by various node links, arranged to form a structure similar to a topologically organized neural network, for example. Once testing analyzer 106 has trained the SOM, testing analyzer 106 may form one or more vector groups for multiple nodes with the SOM. The vector groups may then be displayed, for example, using a GUI.

Subsequent to processing, testing analyzer 106 may output test analysis files 114 to testing evaluator array 108. Output test analysis files 114 may include information that may be used to group certain test result files 112 based on how closely they are related to each other (e.g., vector groups), or instructions on how to display grouped test result files. Testing analyzer 106 may also output test analysis files 114 to testing server array 104 to influence future automated test runs for testing client array 102.

In various embodiments, testing system 100 may include testing evaluator array 108 to receive test analysis files 114. Testing evaluator array 108 may comprise multiple evaluator units **108-1-*p*. Evaluator units 108-1-*p* may be used by human test result analyzers to further analyze test result files 112 as classified by test analysis files 114. Evaluator units 108-1-*p* may each include a GUI to assist in conveying information about test result files 112 and test analysis files 114 to the user. Evaluator units 108-1-*p* may be implemented using the same or similar devices as described with reference to testing units 102-1-*m*, and others as well. Testing evaluator array 108 may also be used to convey analyzer instructions 116 to influence or control various analysis parameters used by testing analyzer 106. For example, analyzer instructions 116 may include various values, parameters or weights to modify the operations of testing analyzer 106**, as described in more detail below.

It is worthy to note that although testing analyzer 106 is described as part of testing system 100, it may be appreciated that testing analyzer 106 may be implemented independent from testing system 100 as well. For example, a single device (e.g., a testing unit **102-1-*m*) implemented with testing analyzer 106 may be arranged with one or more elements of testing client array 102, testing server array 104, and/or testing evaluator array 108, to perform the various testing operations as described herein, as well as other testing operations. Testing analyzer 106 may be described in more detail with reference to FIG. 2**.

Figure 2:
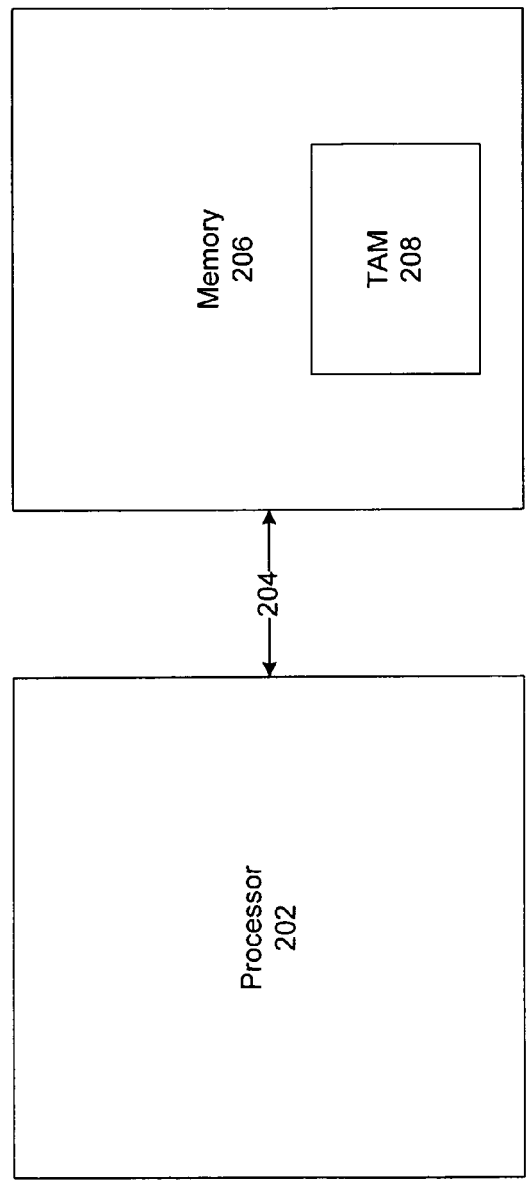
FIG. 2 illustrates an exemplary embodiment of a processing system.

FIG. 2 illustrates one embodiment of a processing system. FIG. 2 illustrates a block diagram of processing system 200 suitable for use with elements 102-108 as described with reference to FIG. 1. In one embodiment, processing system 200 may provide computing or processing operations for testing analyzer 106 and/or testing evaluator array 108. For example, processing system 200 may be used to implement various operations for a test analysis manager (TAM) 208 on behalf of testing analyzer 106 and/or testing evaluator array 108, and other operations as well. The embodiments are not limited in this context.

In various embodiments, processing system 200 may be capable of executing various types of software programs. Software programs may be generally grouped into application programs and system programs. Application programs allow a user to accomplish one or more specific tasks. Typical applications include office suites, business software, educational software, databases, communications software, computer games, and so forth. Examples of application programs may include mail programs, web browsers, personal information manager applications, calendar programs, scheduling programs, contact management programs, gaming programs, word processing programs, spreadsheet programs, picture management programs, video reproduction programs, audio reproduction programs, groupware programs, and so forth. Most application software includes a GUI to communicate information between a device and a user. System programs assists in the running of a computer system. System programs may be directly responsible for controlling, integrating, and managing the individual hardware components of the computer system. Examples of system programs may include operating systems (OS), device drivers, programming tools, utility programs, software libraries, interfaces, program interfaces, API, and so forth.

In various embodiments, processing system 200 may be capable of executing various types of system programs, such as different OS. In computing, an OS is the system software responsible for the direct control and management of hardware and basic system operations. Additionally, it provides a foundation upon which to run application software such as word processing programs and web browsers. Testing analyzer 106 may utilize any OS suitable for general purpose computers, such as the MICROSOFT WINDOWS® XP ("XP") operating system, the MICROSOFT WINDOWS® 2000 operating system, the APPLE® MAC® OS X operating system, and others. The embodiments are not limited in this context.

In various embodiments, processing system 200 may include processor 202. Processor 202 may be implemented using any processor or logic device, such as a complex instruction set computer (CISC) microprocessor, a reduced instruction set computing (RISC) microprocessor, a very long instruction word (VLIW) microprocessor, a processor implementing a combination of instruction sets, or other processor device. In one embodiment, for example, processor 202 may be implemented as a general purpose processor, such as a processor made by Intel® Corporation of Santa Clara, Calif., Advanced Micro Devices, Inc. of Sunnyvale, Calif., and so forth. Processor 202 may also be implemented as a dedicated processor, such as a controller, microcontroller, embedded processor, a digital signal processor (DSP), a network processor, a media processor, an input/output (I/O) processor, a media access control (MAC) processor, a radio baseband processor, a field programmable gate array (FPGA), a programmable logic device (PLD), and so forth. The embodiments, however, are not limited in this context.

In one embodiment, processing system 200 may include memory 206 to connect to processor 202 via memory bus 204. Memory 206 may be implemented using any machine-readable or computer-readable media capable of storing data, including both volatile and non-volatile memory. For example, memory 206 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy to note that some portion or all of memory 206 may be included on the same integrated circuit as processor 202 thereby obviating the need for bus 204. Alternatively some portion or all of memory 206 may be disposed on an integrated circuit or other medium, for example a hard disk drive, that is external to the integrated circuit of processor 202, and processor 202 may access memory 206 via memory bus 204. The embodiments are not limited in this context.

In various embodiments, memory 206 may store one or more software components. A software component may refer to one or more programs, or a portion of a program, used to implement a discrete set of operations. In one embodiment, for example, memory 206 may include one or more software components, such as test analysis manager (TAM) 208. TAM 208 may be responsible for certain test result analysis operations of testing analyzer 106. It is worthy to note that although some embodiments may implement various software components using processing system 200, it may be appreciated that some or all of the operations of the software components may be implemented using other processors accessible by testing analyzer 106. Furthermore, the software components may also be implemented using dedicated hardware circuits or structures, or a combination of dedicated hardware and software, as desired for a given implementation. The embodiments are not limited in this context.

In various embodiments, TAM 208 may organize test result files 112 to assist in test result analysis. The test results may include one or more test result files 112 having failure information. In one embodiment, for example, a vector may be generated with failure information from each test result file. Some or all of the vectors may be used to train multiple nodes for a SOM. The SOM may comprise a form of neural network having a set of dispersed nodes. Once the SOM has been trained, vector groups may be formed for multiple nodes using the SOM. The vector groups may be displayed using, for example, a GUI to facilitate presenting the vector group information to a user in a meaningful way. In this manner, TAM 208 may be used as a global issue finding tool that takes the test results from one or more test runs and attempts to intelligently classify the failing test results. The classifying operations may group related test failures closer to each other while dispersing unrelated test failures away from each other. This may assist a user in performing further test result analysis, prioritizing fault clusters, identifying common faults, performing fault resolution, and so forth. TAM 208 may be described in more detail with reference to FIG. 3.

Figure 3:
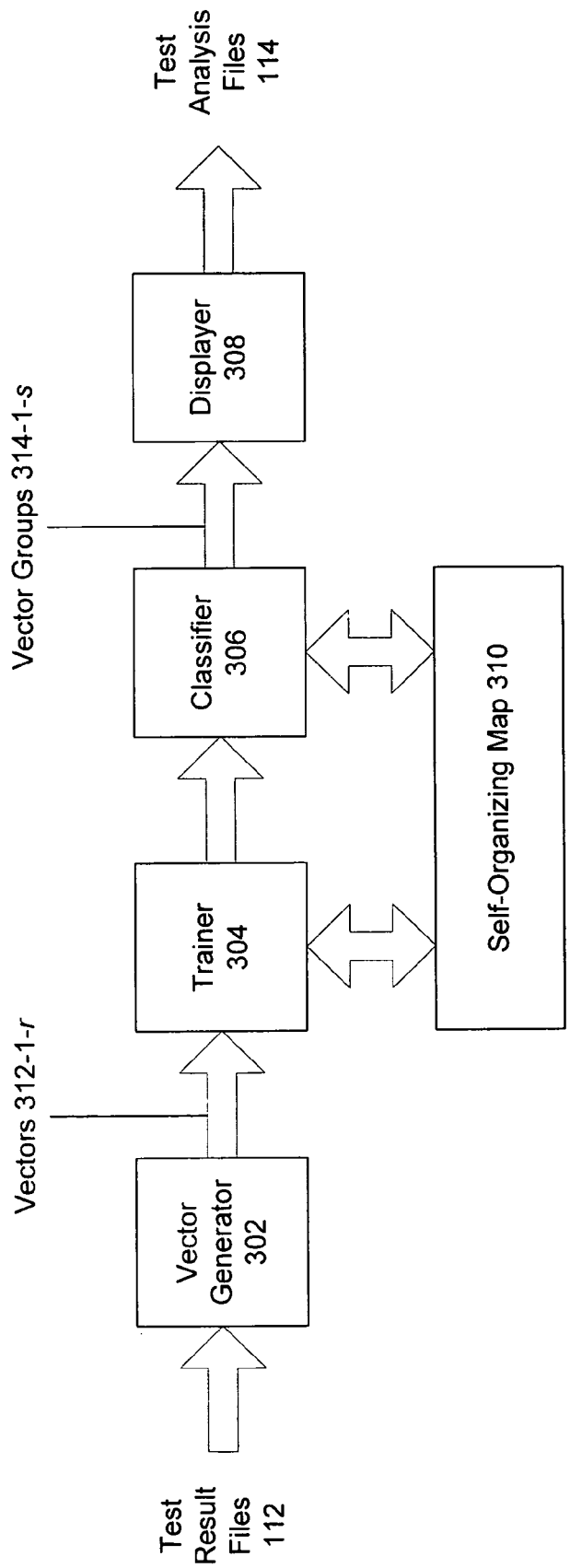
FIG. 3 illustrates an exemplary embodiment of a test analysis manager.

FIG. 3 illustrates one embodiment of a test analysis manager. In particular, FIG. 3 illustrates a more detailed block diagram of TAM 208. As shown in FIG. 3, TAM 208 may include a vector generator 302, a trainer 304, a classifier 306, and a displayer 308. Trainer 304 and classifier 306 may further communicate information with a SOM 310. Although FIG. 3 illustrates a limited number of elements by way of representative example, it may be appreciated that the elements may be combined into fewer elements or expanded into more elements and still fall within the intended scope of the embodiments. Accordingly, the embodiments are not limited in this illustrated context.

In various embodiments, TAM 208 may include vector generator 302. Vector generator 302 may be arranged to generate vectors with failure information from test result files 112. Vector generator 302 may take a collection of failing results in the form of test result files 112, and convert them into vectors 312-1-r. Each vector 312-1-r may comprise an abstract representation of the result for which each dimension represents a salient part or characteristic of the result. Vector generator 302 may parse and extract failure information from test result files 112, generate vectors 312-1-r using the extracted failure information, and output vectors 312-1-r to trainer 304.

In various embodiments, vectors 312-1-r may have any number of dimensions. In one embodiment, for example, vectors 312-1-r may have four dimensions, to include an exception message, a first call, a last call, and image histogram. The image histogram may comprise a more compact representation of an image extracted from a test result file 112, such as an exception message, for example. The first three dimensions are strings. The image histogram may comprise three 256-element double-floating point arrays. In this case, vectors 312-1-r may have a total of 3 strings plus 768 array elements for a total of 771 dimensions. Vectors 312-1-r may have any number of dimensions, however, as desired for a given implementation.

In various embodiments, vectors 312-1-r may include failure information stored in the form of strings. The strings may include any acceptable string information, such as text, numbers, symbols, punctuation, and so forth. For example, an exception message may represent an error message from the test log, such as "Could Not Find Saved File" or "Failed To Open File." A first call may represent the first actual function call after the basic test calls such as RUN and so forth. A last call may represent the last function call on the exception stack prior to hitting the exception.

In various embodiments, vectors 312-1-r may include failure information stored as values, such as an image histogram. The image histogram may comprise a more compact representation of an image extracted from test result files 112, such as a screen shot of the screen as displayed when the failure occurred during testing operations by testing client array 102. The elements of the image histogram may be used to represent the intensity of a specific value of color. For example, pixel value level 200 may be used to represent the intensity level of red 200 on the red-green-blue (RGB) scale, as described in more detail below. It is worthy to note that vector generator 302 normalizes all the pixel values levels at construction of vectors 312-1-r to provide a normalized image histogram.

Once generated, TAM 208 may process vectors 312-1-r in an attempt to categorize, group, cluster or otherwise classify certain vectors based on how related the vectors are to each other. A number of classifying techniques may be used to classify vectors 312-1-r. For example, classifying techniques such as decision trees, Bayesian classifiers, and others are all possible classifier techniques suitable for use with TAM 208. In particular, clustering may be a desirable classifying technique since it may cluster similar or related results together. This may be accomplished using, for example, trainer 304, classifier 306 and a self-organizing map (SOM), such as SOM 310.

In various embodiments, TAM 208 may include SOM 310. SOM 310 may represent a type of neural network comprising a map with multiple nodes linked according to some topographical constraints. For example, SOM 310 may comprise multiple nodes having a geographic distance from each other. As used herein, the term geographic distance may refer to a physical and/or logical distance between two entities. The particular geographic distance for SOM 310 may be implemented using distance weights, with nodes passing weights more strongly to their closer geographical neighbors. SOM 310 may be a particularly useful structure since it captures the general concept of nodes that are farther apart may have less relevance than nodes that are closer together. SOM 310 may be described in more detail with reference to FIG. 4.

Figure 4:
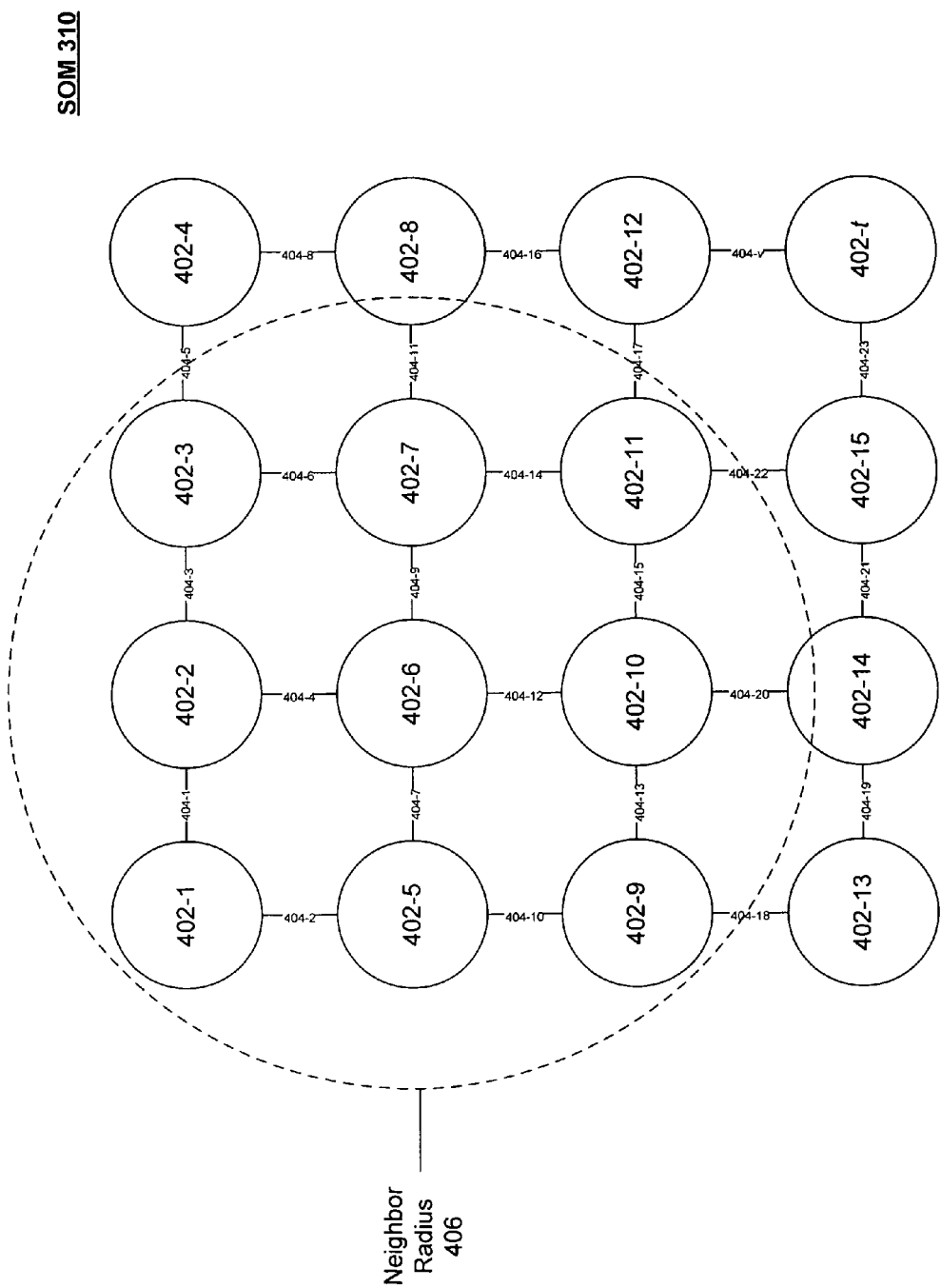
FIG. 4 illustrates an exemplary embodiment of a self-organizing map.

FIG. 4 illustrates one embodiment of a self-organizing map. FIG. 4 illustrates a more detailed diagram of SOM 310. As shown in FIG. 4, SOM 310 may comprise multiple nodes 402-1-t connected by node links 404-1-v. Nodes 402-1-t may represent a set of values for a model vector. In one embodiment, for example, nodes 402-1-t may represent the same or similar set of values as defined for vectors 312-1-r. Node links 404-1-v may represent a geographic distance between nodes 402-1-t. The geographic distance may vary between any two given nodes 402-1-t, as controlled by weighting values used during training operations of SOM 310 as managed by trainer 304, for example.

Referring again to FIG. 3, TAM 208 may include trainer 304. Trainer 304 may be arranged to train the nodes 402-1-t of SOM 310 with multiple vectors 312-1-r as received from vector generator 302. Trainer 304 may train SOM 310 so that certain nodes 402-1-t match against certain types of results, so that one node 402-1-t will attract a certain type of result while a different node 402-1-t farther away will attract a different type of result. In this type of arrangement, nodes 402-1-t that are closer together tend to attract similar types of results. Consequently, when viewing the map graphically using a GUI, results are highly likely to be related when they map to the same node 402-1-*t* or to nodes 402-1-*t* that are in close proximity to each other.

TAM 208 may perform the training of SOM 310 using a Gaussian distribution to control the geographical distance of node links 404-1-*v* and a linear weight update rule. Alternatively, the geographical distance may also be controlled using other suitable distribution techniques, such as a square distribution technique, for example. A square distribution technique may refer to a function that decreases with respect to the shape of a rectangle. Any distribution technique may be used, however, to define or describe relationships between neighboring or typographically proximate nodes. The embodiments are not limited in this context.

Trainer 304 may initiate training operations for SOM 310 by treating each node 402-1-*t* as a random vector. Each node 402-1-*t* may have the same or similar values, weights, dimensions or characteristics as a vector 312-1-*r*, thereby facilitating comparison operations between a given node 402-1-*t* and a given vector 312-1-*r*. For example, vectors 312-1-*r* may have four dimensions, to include an exception message, a first call, a last call, and image histogram. The first three dimensions may comprise strings, while the image histogram may comprise three 256-element double-floating point arrays. In this case, vectors 312-1-*r* may have a total of 3 strings plus 768 array elements for a total of 771 dimensions. Nodes 402-1-*t* may be defined to have the same or similar dimensions as vectors 312-1-*r*, which in this case includes 3 strings plus 768 array elements for a total of 771 dimensions.

Trainer 304 may randomize all nodes 402-1-*t* for SOM 310 so that the corresponding weights are randomized. For example, the 3 strings may be set to empty or null strings, and the array elements may be set to any random value between 0 and 1. After initialization, SOM 310 contains no relational information and is ready for training operations. Trainer 304 may train the initialized SOM 310 against a set of sample vectors from vectors 312-1-*r*. For each vector 312-1-*r*, trainer 304 may try to find a node 402-1-*t* that has the least distance in vector-space away from the sample vector. Trainer 304 may adjust, modify or update the center node 402-1-*t* and its surrounding neighbor nodes within neighbor radius 406 to look more like a given vector 312-1-*r* that matches against the center node 402-1-*t*. In this manner, trainer 304 reinforces certain nodes 402-1-*t* to look like certain vectors 312-1-*r* on the map.

SOM 310 may be implemented as a generic class that requests trainer 304 to pass in a template parameter that is a class which implements an IVector interface as described in more detail below. Once this is accomplished, SOM 310 may be instantiated with a width and a height. Calling a Reset function on SOM 310 will randomize all the weights of nodes 402-1-*t*. Calling a Train function with a list of vectors from vectors 312-1-*r* will train SOM 310 against the set of vectors. Trainer 304 may also pass in one or more parameters to SOM 310 to control various properties of SOM 310, such as an alpha parameter, a gamma parameter, a theta parameter and a lambda parameter. These parameters may control how much nodes 402-1-*t* are updated during training operations, and how influential training operations are on nodes 402-1-*t*. For example, trainer 304 may use the alpha and gamma parameters to control a learning rate for nodes 402-1-*t* and a rate of decay for the learning rate, respectively. Trainer 304 may use the theta and lambda parameters to control a neighbor radius 406 for nodes 402-1-*t* and a rate of decay for neighbor radius 406, respectively. Other parameters may be used as well as desired for a given implementation.

In one embodiment, for example, trainer 304 may perform training operations for SOM 310 using an IVector interface. The IVector interface may define, for example, how a distance is measured or determined between any two vectors 312-1-*r* of the same type, a way to update the weights (e.g., dimension values) of the vector 312-1-*r*, and a way to randomize the weights of the vector 312-1-*r*. One design consideration for the IVector interface is defining and implementing a good metric for determining a distance between any given two vectors 312-1-*r*, and also how to update a vector 312-1-*r* to look like another vector 312-1-*r*. In one embodiment, for example, the distance operations and update operations may be accomplished using a ResultVector class.

The ResultVector class may be used to determine distance values between the various dimensions selected for vectors 312-1-*r*. As previously described, vectors 312-1-*r* may have four dimensions, to include a scenario exception, a first call, a last call, and image histogram. The first three dimensions are strings, while the image histogram comprises three 256-element double-floating point arrays. When comparing two vectors 312-1-*r*, the ResultVector class may be used to determine string distance values between strings, and image distance values between images and/or image histograms. Furthermore, there are two static variables on the ResultVector class that determine how much to weight the string distance values and the image distance values. The string distance values, image distance values, and weightings for each, may be used to calculate or determine a total distance value between any two given vectors 312-1-*r*, or a vector 312-1-*r* and a node 402-1-*t*. In one embodiment, for example, a total distance value (TDV) may be determined by taking the string distance value (SDV) times the string weight (SW) plus the image distance value (IDV) times the image weight (IW), as represented by Equation (1) as follows:

$$TDV=(SDV*SW)+(IDV*IW) \quad (1)$$

The ResultVector class may employ different techniques to perform string distance operations and string update operations between any two vectors 312-1-*r*, or a vector 312-1-*r* and a node 402-1-*t*. The string distance operations may be used to measure a distance between various strings of vectors 312-1-*r* and nodes 402-1-*t*. The string update operations may be used to update a learning rate during training operations of SOM 310. The learning rate may control, for example, how much a vector 312-1-*r* modifies a node 402-1-*t* when there is a match.

In various embodiments, the ResultVector interface may use a linear update rule when comparing the first and last call strings between two vectors 312-1-*r*, or a vector 312-1-*r* and a node 402-1-*t*. If the first and last call strings match their counterparts, then the string distance value for a vector 312-1-*r* or node 402-1-*t* may be increased by 0.5 increments or some other desired value. Otherwise, the string distance value remains the same and does not increase. The linear update rule may provide reduced complexity when matching a relatively finite list of call strings. A more complex update rule may be needed, however, when comparing failure messages, such as exception messages, for example.

In various embodiments, the ResultVector class may use various distance metrics to compare exception messages between two vectors 312-1-*r*, or a vector 312-1-*r* and a node 402-1-*t*. Other than using an exact comparison between the strings of two exception messages, it may be difficult to identity a metric to measure the distance between two different strings. A number of different distance techniques may be used to measure the distance between vectors and/or nodes. Examples of suitable distance techniques may include a Hamming distance technique, a Levenshtein distance technique, a Needleman-Wunsch distance technique, a genetic algorithm distance technique, a Euclidean distance technique, and so forth. The embodiments are not limited in this context.

In various embodiments, the ResultVector class may use a string alignment algorithm to compare exception messages between two vectors 312-1-$r$, or a vector 312-1-$r$ and a node 402-1-$t$. In one embodiment, for example, trainer 304 may use a string alignment algorithm to deduce an edit distance between the strings. The edit distance may refer to the processing cost of turning one string into another by associating costs with various editing operations (e.g., insert, replace, delete, and so forth) for one or more characters of one of the comparison strings.

Various types of string alignment algorithms may be used to perform the string alignment operations. In one embodiment, for example, the string alignment algorithm may be quadratic. For example, the string alignment algorithm may be represented as O(ab), where a and b represent the lengths of the strings. In another embodiment, however, the string alignment algorithm may be implemented using a subquadratic algorithm. A subquadratic algorithm may potentially improve performance at the cost of added complexity. The embodiments are not limited in this context.

In one embodiment, for example, a Needleman-Wunsch sequence alignment algorithm may be used. The Needleman-Wunsch sequence alignment algorithm may produce a matrix where the bottom-right element contains an alignment score. This score is on a scale, however, from negative infinity representing greater differences between two strings, to positive infinity representing fewer differences between two strings. In one embodiment, this score may be rescaled to use the value 0 to represent no distance between strings when equal, and infinity to represent greater differences between strings, in an effort to provide a more useful measurement. Accordingly, the score may be rescaled, the sign flipped, and exponentiation to the power of e may be applied in order to achieve the desired effect.

In various embodiments, the ResultVector class may also use the string alignment algorithm to perform string update operations. The same or similar computed matrix used to derive an edit distance may also be used to perform string updates. The matrix may be used to backtrack and extract the aligned strings. A determination may be made as to whether to perform the appropriate edit in order to make one string look more like the other based on the alignments and a threshold value. As a result, one string may be updated to be more like another string by using the edit information.

In various embodiments, string update operations may be controlled using various parameters. In one embodiment, for example, string update operations may be controlled using an alpha parameter. The alpha parameter of SOM 310 may represent a learning rate, and may be used to control an update threshold for updating the strings. For example, assume the alpha parameter has a value between 1 and 0. As the alpha parameter has a value approaching 1, the more a node 402-1-$t$ may be updated to appear like the compared vector 312-1-$r$. As the alpha parameter has a value approaching 0, the less a node 402-1-$t$ may be updated to appear like the compared vector 312-1-$r$.

In one embodiment, for example, string update operations may be performed in accordance with a gamma parameter. The gamma parameter may be used to control a rate of decay for the learning rate for nodes 402-1-$t$ as represented by the alpha parameter. The gamma parameter may slow the rate of learning for nodes 402-1-$t$ of SOM 310. For example, the gamma parameter may be implemented using a time decay where trainer 304 slows the learning rate for nodes 402-1-$t$ over a defined time period for training operations of SOM 310. In this case, a vector 312-1-$r$ may have more influence in modifying a randomized node 402-1-$t$ earlier in time, and less influence later in time, with the assumption that more vectors 312-1-$r$ will have been used for training operations over time.

In one embodiment, for example, string update operations may be performed in accordance with a theta parameter. The theta parameter may be used to control a neighbor radius 406 for nodes 402-1-$t$. For example, the theta parameter may cause certain nodes 402-1-$t$ to cluster together, and other nodes 402-1-$t$ to disperse. When a node 402-1-$t$ is updated to look more like a vector, surrounding nodes within neighbor radius 406 may be updated as well. As shown in FIG. 4, for example, a neighbor radius for node 402-6 may includes nodes 402-1, 402-2, 402-3, 402-5, 402-7, 402-9, 402-10, and 402-11. It may be appreciated that the set of nodes within neighbor radius 406 may change as the center node changes. The amount by which nodes 402-1-$t$ within neighbor radius 406 are updated may decrease as the distance from the center node 402-1-$t$ (e.g., node 402-6) increases. In this manner, the theta parameter may be a value to control a geographic distance between clusters of nodes 402-1-$t$ as represented by node links 404-1-$v$.

In one embodiment, for example, string update operations may be performed in accordance with a lambda parameter. The lambda parameter may be used to control the rate of decay for the neighbor radius of nodes 402-1-$t$ as represented by the theta parameter. As with the gamma parameter, the lambda parameter may slow the rate of learning for nodes 402-1-$t$ of SOM 310 within the neighbor radius. Various types of decay techniques may be used, such as a time decay, a Gaussian distribution decay, a rectangular decay, a distance decay, and so forth. For example, the lambda parameter may be implemented using a time decay where trainer 304 slows the learning rate for nodes 402-1-$t$ within the neighbor radius over a defined time period for training operations of SOM 310. In this case, a vector 312-1-$r$ may have more influence in modifying a set of nodes surrounding a randomized node 402-1-$t$ earlier in time, and less influence later in time, with the assumption that more vectors 312-1-$r$ will have been used for training operations over time.

Similar to string distance operations and string update operations, the ResultVector class may employ various techniques to perform image distance operations and image update operations between any two vectors 312-1-$r$, or a vector 312-1-$r$ and a node 402-1-$t$, for example. The image distance operations may be used to measure a distance between various images and/or image histograms of vectors 312-1-$r$ and nodes 402-1-$t$. The image update operations may be used to update a learning rate during training operations of SOM 310.

The ResultVector class may be used to perform image distance operations and image update operations. In some cases, vectors 312-1-$r$ may use the entire image as retrieved from a test result file 112. Maintaining a copy of the entire image, however, may consume a significant number of processing cycles due to the number of comparisons needed to compare two entire images. For example, a single 15×15 map may comprise approximately 255 nodes 402-1-*t*, and therefore a single vector 312-1-*r* would require 1024×768×3 comparisons for one node (e.g., one for each color for each pixel). Consequently, while the ResultVector class may be used to compare entire images to perform image distance operations, this technique may be computationally expensive for the desired output.

In an effort to reduce the number of comparisons for vectors 312-1-*r*, the image information may be aggregated as an image histogram that provides some level of uniqueness for each image. An image histogram may comprise multiple buckets, with each bucket representing an RGB color such as a red bucket, a green bucket, and a blue bucket, for example. Assuming 8-bit pixel values, each pixel value may have a value range between 0 and 255. In this case, each color bucket may have up to 256 buckets or 768 buckets in total. The buckets may be normalized so that all bucket values are between 0 and 1 to facilitate comparison operations. A Euclidean distance in "bucket space" may be used to compare the distance between two image histograms. For example, the squared distance between each bucket (e.g., this.levels[1][10]-other.levels[1][10]) may be computed for all 768 buckets, and the square distances may be summed. The total sum may be used, for example, as the distance between two image histograms.

In various embodiments, the ResultVector class may use the same or similar parameters to perform image update operations as previously described with reference to the string update operations. In one embodiment, for example, the ResultVector class may use a linear update algorithm to perform image update operations. For example, an alpha parameter of the map may represent a learning rate, and may be used to control an update threshold to update the gain for the image histogram values. To update x, for example, x may be updated in accordance with Equation (2) as follows:

$$x=x+\text{alpha}(y-x) \quad (2)$$

where y is the value to move toward, and alpha is a learning rate between the values of 0 and 1. For example, assume an array element for a node 402-1-*t* has a current pixel value of 90, an array element for a matching vector 312-1-*r* for node 402-1-*t* has a corresponding pixel value of 100, and the alpha parameter is set to 1. In this case, the current pixel value of 90 may be updated or modified to a new pixel value of 100 (e.g., 90+1(100−90)=100) in accordance with Equation (2). When the value of 1 is reached the update threshold moves completely to y. As the alpha parameter decreases, however, smaller steps may be taken towards y.

Trainer 304 may complete training operations for SOM 310 in a number of different ways. For example, trainer 304 may complete training operations for SOM 310 after processing a defined number of vectors 312-1-*r*. In another example, trainer 304 may complete training operations for SOM 310 by having SOM 310 process a random sampling of vectors 312-1-*r* over a defined period of time. The particular number of vectors 312-1-*r* and length of time used to train SOM 310 may vary as desired for a given implementation. Furthermore, trainer 304 may train SOM 310 using historical data saved from previous sets of vectors. For example, trainer 304 may not necessarily initialize SOM 310 for every new set of vectors, but rather may refine training of a previously trained SOM 310 with the new set of vectors. In addition, trainer 304 may use a previously trained SOM 310 stored as part of a data library of trained SOM 310 to reduce or obviate training operations for a new set of vectors. For example, trainer 304 may extract the dimensions for a given set of vectors, and attempt to find a previously trained SOM 310 having the same or similar dimensions as the given set of vectors. This may be useful, for example, whenever there is insufficient time, resources or need to perform training operations for a given set of vectors. The embodiments are not limited in this context.

In various embodiments, TAM 208 may include classifier 306. Classifier 306 may be arranged to classify vectors in various groups in accordance with a number of classifying techniques. For example, classifying techniques such as decision trees, Bayesian classifiers, and others are all possible classifier techniques suitable for use with classifier 306. When implemented with SOM 310, classifier 306 may be arranged to classify vectors into groups based on how close each vector is to a given node.

In one embodiment, for example, classifier 306 may be arranged to form one or more vector groups 314-1-*s* for multiple nodes with SOM 310. After trainer 304 completes training operations for SOM 310, classifier 306 may map vectors 312-1-*r* onto the trained SOM 310 by looking for a node 402-1-*t* that is some predefined distance (e.g., a minimal distance) between a given node 402-1-*t* and a given vector 312-1-*r*. Classifier 306 may accomplish this using the same or similar IVector interface and/or ResultVector class as previously described with reference to trainer 304. Once SOM 310 has processed all of vectors 312-1-*r*, classifier 306 may output the mapped vectors 312-1-*r* as vector groups 314-1-*s*.

Each vector group 314-1-*s* may represent those vectors 312-1-*r* that map to a given node 402-1-*t* of SOM 310. The mapping operations performed by classifier 306 may organize, cluster, group or otherwise classify vectors based on similarities between the vectors as defined by the total distance between a node and a vector. In one embodiment, for example, a total distance value between any two given vectors 312-1-*r*, or a vector 312-1-*r* and a node 402-1-*t*, may be determined using TDV=(SDV*SW)+(IDV*IW) as previously defined in Equation (1). Consequently, the distance measurement techniques and resulting distance values may be defined in a manner that controls how vectors 312-1-*r* and nodes 402-1-*t* are related, and the various degrees or granularity for each relationship. Vector groups 314-1-*s* may then be used to perform more detailed test result analysis by other automated programs or a human test analyzer.

In various embodiments, TAM 208 may include displayer 308. Displayer 308 may be used to display nodes 402-1-*t* and/or vector groups 314-1-*s*. Displayer 308 may include a GUI, or alternatively, have access to a GUI such as provided by the resident OS for testing analyzer 106. Displayer 308 may use the GUI or provide information to the GUI to expose a map of test case failures and their spatial relationships to one another to result analyzers using testing evaluator array 108. It may be appreciated that displayer 308 may display nodes 402-1-*t* and/or vector groups 314-1-*s* in a number of different ways to meaningfully convey grouping or classifying information to a human operator. In one embodiment, for example, the GUI may be implemented as an Xceed Chart Component. For example, SOM 310 may be displayed as a bubble chart. Each node 402-1-*t* may be drawn as a bubble if there is a vector 312-1-*r* that maps to the node 402-1-*t*. Nodes 402-1-*t* with more than one vector 312-1-*r* may increase in bubble size accordingly. Furthermore, the color may change with the increase in results as well to provide more differentiation information for a human operator. Other display techniques may be used to convey analysis information to a human operator, however, and still fall within the scope of the embodiments. For example, suitable display techniques may highlight failure results using color, weight, shading, page placement, and so forth. The embodiments are not limited in this context.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 5:
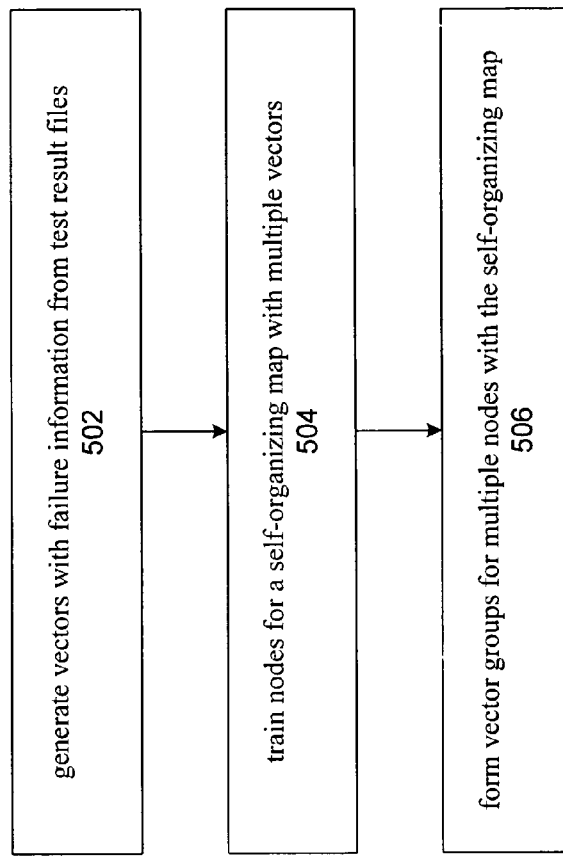
FIG. 5 illustrates an exemplary embodiment of a logic diagram.

FIG. 5 illustrates one embodiment of a logic flow. FIG. 5 illustrates a logic flow 500. Logic flow 500 may be representative of the operations executed by one or more embodiments described herein, such as testing system 100, processing system 200, testing analyzer 106, and/or TAM 208. As shown in logic flow 500, vectors with failure information may be generated from test result files at block 502. Nodes for a self-organizing map may be trained with multiple vectors at block 504. Vector groups may be formed for multiple nodes with the self-organizing map at block 506. The embodiments are not limited in this context.

In one embodiment, the vector groups may be displayed. For example, the vector groups may be displayed using a GUI. The embodiments are not limited in this context.

In one embodiment, a string and an image may be extracted from a test result file. An image histogram may be generated for the image. A vector may be generated for the test result file with the string and the image histogram. The embodiments are not limited in this context.

In one embodiment, a node string value for a node may be initialized. A vector string value for a vector may be compared with the node string value. A string distance value between the vector string value and the node string value may be generated. The node string value may be modified using the string distance value. The embodiments are not limited in this context.

In one embodiment, a vector string value for a vector may be compared with a node string value for a node. A string distance value between the vector string value and the node string value may be generated. The vector may be mapped to the node using the string distance value. The embodiments are not limited in this context.

In one embodiment, a node image value for a node may be initialized. A vector image value for a vector may be compared with the node image value. An image distance value between the vector image value and the node image value may be generated. The node image value may be modified using the image distance value. The embodiments are not limited in this context.

In one embodiment, a vector image value for a vector may be compared with a node image value for a node. An image distance value between the vector image value and the node image value may be generated. The vector may be mapped to the node using the image distance value.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

It is also worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

In various embodiments, testing system 100 may be implemented as a wireless communication system, a wired communication system, or a combination of both. When implemented as a wireless communication system, testing system 100 may include components and interfaces suitable for communicating over wireless shared media, such as one or more antennas, transmitters, receivers, transceivers, amplifiers, filters, control logic, and so forth. An example of wireless shared media may include portions of a wireless spectrum, such as the radio-frequency (RF) spectrum. When implemented as a wired communications system, testing system 100 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit boards (PCB), backplanes, switch fabrics, semiconductor material, twisted-pair wire, co-axial cable, fiber optics, a propagate signal, and so forth. The embodiments are not limited in this context.

Some embodiments may be implemented using an architecture that may vary in accordance with any number of factors, such as desired computational rate, power levels, heat tolerances, processing cycle budget, input data rates, output data rates, memory resources, data bus speeds and other performance constraints. For example, an embodiment may be implemented using software executed by a general-purpose or special-purpose processor. In another example, an embodiment may be implemented as dedicated hardware. In yet another example, an embodiment may be implemented by any combination of programmed general-purpose computer components and custom hardware components. The embodiments are not limited in this context.

Various embodiments may be implemented using one or more hardware elements. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. The embodiments are not limited in this context.

Various embodiments may be implemented using one or more software elements. In general, a software element may refer to any software structures arranged to perform certain operations. In one embodiment, for example, the software elements may include program instructions and/or data adapted for execution by a hardware element, such as a processor. Program instructions may include an organized list of commands comprising words, values or symbols arranged in a predetermined syntax, that when executed, may cause a processor to perform a corresponding set of operations. The software may be written or coded using a programming language. Examples of programming languages may include C, C++, C Sharp, BASIC, Perl, Matlab, Pascal, Visual BASIC, JAVA, ActiveX, assembly language, machine code, and so forth. The software may be stored using any type of computer-readable media or machine-readable media. Furthermore, the software may be stored on the media as source code or object code. The software may also be stored on the media as compressed and/or encrypted data. Examples of software may include any software components, programs, applications, computer programs, application programs, system programs, machine programs, operating system software, middleware, firmware, software modules, routines, subroutines, functions, methods, interfaces, software interfaces, application program interfaces (API), instruction sets, computing code, computer code, code segments, computer code segments, words, values, symbols, or any combination thereof. The embodiments are not limited in this context.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, and the like. The instructions may be implemented using any suitable high-level, low-level, object-oriented, visual, compiled and/or interpreted programming language, such as C, C++, Java, BASIC, Perl, Matlab, Pascal, Visual BASIC, assembly language, machine code, and so forth. The embodiments are not limited in this context.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method, comprising:
generating vectors with failure information from test result files;
training nodes for a self-organizing map with multiple vectors; and
forming vector groups for multiple nodes with said self-organizing map.

2. The method of claim 1, comprising displaying said vector groups.

3. The method of claim 1, comprising:
extracting a string and an image from a test result file;
generating an image histogram for said image; and
generating a vector for said test result file with said string and said image histogram.

4. The method of claim 1, comprising:
initializing a node string value for a node;
comparing a vector string value for a vector with said node string value;
generating a string distance value between said vector string value and said node string value; and
modifying said node string value using said string distance value.

5. The method of claim 1, comprising:
comparing a vector string value for a vector with a node string value for a node;
generating a string distance value between said vector string value and said node string value; and
mapping said vector to said node using said string distance value.

6. The method of claim 1, comprising:
initializing a node image value for a node;
comparing a vector image value for a vector with said node image value;
generating an image distance value between said vector image value and said node image value; and
modifying said node image value using said image distance value.

7. The method of claim 1, comprising:
comparing a vector image value for a vector with a node image value for a node;
generating an image distance value between said vector image value and said node image value; and
mapping said vector to said node using said image distance value.

8. An article comprising a machine-readable storage medium containing instructions that if executed enable a system to generate vectors with failure information from test result files, train nodes for a self-organizing map with multiple vectors, and form vector groups for multiple nodes with said self-organizing map.

9. The article of claim 8, comprising instructions that if executed enable the system to display said vector groups.

10. The article of claim 8, comprising instructions that if executed enable the system to extract a string and an image from a test result file, generate an image histogram for said image, and generate a vector for said test result file with said string and said image histogram.

11. The article of claim 8, comprising instructions that if executed enable the system to initialize a node string value for a node, compare a vector string value for a vector with said node string value, generate a string distance value between said vector string value and said node string value, and modify said node string value using said string distance value.

12. The article of claim 8, comprising instructions that if executed enable the system to compare a vector string value for a vector with a node string value for a node, generate a string distance value between said vector string value and said node string value, and map said vector to said node using said string distance value.

13. The article of claim 8, comprising instructions that if executed enable the system to initialize a node image value for a node, compare a vector image value for a vector with said node image value, generate an image distance value between said vector image value and said node image value, and modify said node image value using said image distance value.

14. The article of claim 8, comprising instructions that if executed enable the system to compare a vector image value for a vector with a node image value for a node, generate an image distance value between said vector image value and said node image value, and map said vector to said node using said image distance value.

15. The article of claim 8, said machine-readable storage medium comprising a processing device, a computer-readable medium, a communications medium, or a propagated signal.

16. An apparatus, comprising:
a vector generator to generate vectors with failure information from test result files;
a trainer to train nodes of a self-organizing map with multiple vectors; and
a classifier to form vector groups for multiple nodes with said self-organizing map.

17. The apparatus of claim 16, comprising a displayer to display said vector groups using a graphics user interface.

18. The apparatus of claim 16, with each vector to comprise a string and an image histogram.

19. The apparatus of claim 16, said self-organizing map to comprise multiple nodes connected by node links.

20. The apparatus of claim 16, comprising:
a testing server array comprising multiple testing servers to provide test instructions; and
a testing client array comprising multiple testing units to output test result files in response to said test instructions.

* * * * *